(12) United States Patent
Houston

(10) Patent No.: US 6,324,767 B1
(45) Date of Patent: Dec. 4, 2001

(54) SIGHT LEVEL

(76) Inventor: Todd Houston, P.O. Box 232184, Anchorage, AK (US) 99523

(*) Notice: Subject to any disclaimer, the term of this patent is extended or adjusted under 35 U.S.C. 154(b) by 0 days.

(21) Appl. No.: 09/454,944

(22) Filed: Dec. 2, 1999

(51) Int. Cl.[7] ................................................. G01C 9/00
(52) U.S. Cl. ........................... 33/365; 33/297; 33/373; 33/528; 33/529
(58) Field of Search .................. 33/274, 281, 282, 33/285, 290, 293, 297, 365, 369, 474, 370, 371, 372, 373, 476, 528, 529, 562, 563, 565, 566, 483, 492, 494, 613, 645, 412, DIG. 10

(56) References Cited

U.S. PATENT DOCUMENTS

| | | | | |
|---|---|---|---|---|
| 1,667,191 | * | 4/1928 | Chapin | 33/476 |
| 2,968,873 | * | 1/1961 | Holderer | 33/371 |
| 3,744,133 | * | 7/1973 | Fukushima et al. | 33/297 |
| 3,819,273 | * | 6/1974 | Uema et al. | 33/293 |
| 4,126,944 | * | 11/1978 | Burkhart | 33/371 |
| 4,549,360 | * | 10/1985 | Allen | 33/293 |
| 4,879,815 | * | 11/1989 | Vischer | 33/293 |
| 5,330,179 | * | 7/1994 | Hampel | 33/379 |
| 5,813,130 | * | 9/1998 | MacDowell | 33/528 |
| 6,032,376 | * | 3/2000 | Shurtleff | 33/391 |

\* cited by examiner

*Primary Examiner*—Andrew H. Hirshfeld
(74) *Attorney, Agent, or Firm*—Michael J. Tavella

(57) ABSTRACT

A level formed of a flat card that has a series of register marks that are printed on it. The register marks are designed to fit square on the rectangular card. The primary marks are positioned at the two ends of the card. When looking at the register marks, the user can see any angular displacement between them. This angular displacement indicates an out of level condition. If the marks are viewed as being completely horizontal, the card is level. To use the device, simple stand the card up on the surface to be leveled. The angular displacement of the register marks instantly show whether the surface that the card is resting on is level. In this way, just about anything can be tested for level. The device can also be placed on walls or other objects to draw level lines or reference marks. It is also useful as a template for tracing or drawing straight lines for sewing or other activities.

8 Claims, 5 Drawing Sheets

SIGHT LEVEL

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention This invention relates to levels and particularly levels mounted on cards.

2. Description of Related Art

The level is an ubiquitous tool. The standard form of level has changed little over hundreds of years. The basic feature of these levels is a liquid-filled tube that has a small air bubble in it. Because liquids always seek their own level, the bubble will be centered in the tube when the tube is held level. Levels are made in a variety of sizes, from a few inches to several feet long. Although these tools are extremely useful, they do have some minor drawbacks. In determining the level of small objects, or determining the level of flat objects on a wall, the standard levels are not easy to use. This, for electrical switch or outlet covers, it is difficult to get a proper level quickly. Leveling pictures or other items is also difficult.

BRIEF SUMMARY OF THE INVENTION

The present invention overcomes these difficulties. It eliminates the need for a bubble tube and the resultant frame. The level is a series of register marks that are printed on a flat card. The register marks are designed to fit square on the rectangular card. The primary marks are positioned at the two ends of the card. When looking at the register marks, the user can see any angular displacement between them. This angular displacement indicates an out of level condition. If the marks are viewed as being completely horizontal, the card is level. To use the device, simple stand the card up on the surface to be leveled. The angular displacement of the register marks instantly show whether the surface that the card is resting on is level. In this way, just about anything can be tested for level. The device can also be placed on walls or other objects to draw level lines or reference marks. It is also useful as a template for tracing or drawing straight lines for sewing or other activities.

Moreover, the card is easy to carry and use. It can be made the size of a typical credit card. Making the card from plastic makes it durable and portable.

The register marks can vary somewhat in placement and color. However, there are preferred placements of the marks. In addition, other reference points may be added to indicate angles or other useful measures, as desired.

DETAILED DESCRIPTION OF THE INVENTION

Figure 1:
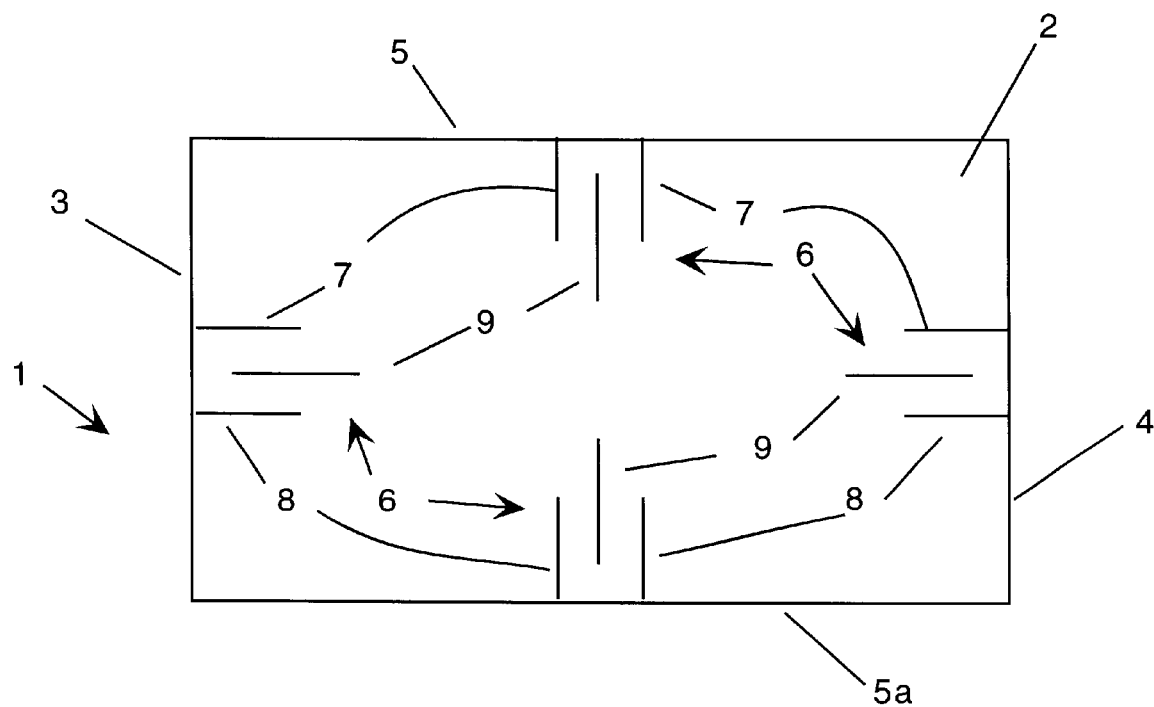
FIG. 1 is a front view of the invention.
Figure 5:
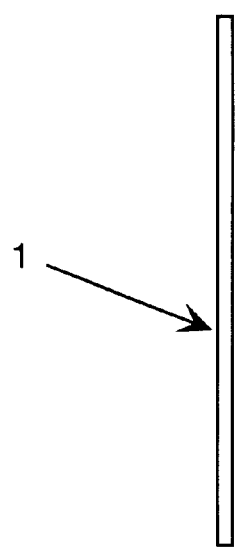
FIG. 5 is a side view of the invention.

Referring now to FIG. 1, the invention is shown. In this embodiment, the invention is a flat card 1. FIG. 5 shows a side view of the card 1. The card is generally rectangular. It has a face surface 2. The face 2 can be clear, white or colored. The card has an outer perimeter formed by two short sides 3 and 4 and a top 5 and bottom 5a. Although the preferred embodiment is rectangular, the device can be made square, triangular or even circular, if desired.

On the top, bottom and sides are a first and second set of registration marks 6. The first set of marks lies the longitudinal central axis of the card. The second set of registration marks lines on the latitudinal central axis of the card as shown. Each of the sets of marks is identical. Each set of marks 6 has a pair of sight marking groups. Each sight marking group has two outer lines 7 and 8, and a centerline 9. The centerline 9 in each of the marks is offset from the other lines as shown. In the preferred embodiment, the centerline is colored red and the outer lines, 7 and 8 are black. However, all three lines may be black. Moreover, the lines may be any color desired. All three of the lines may be different colors as well.

Figure 2:
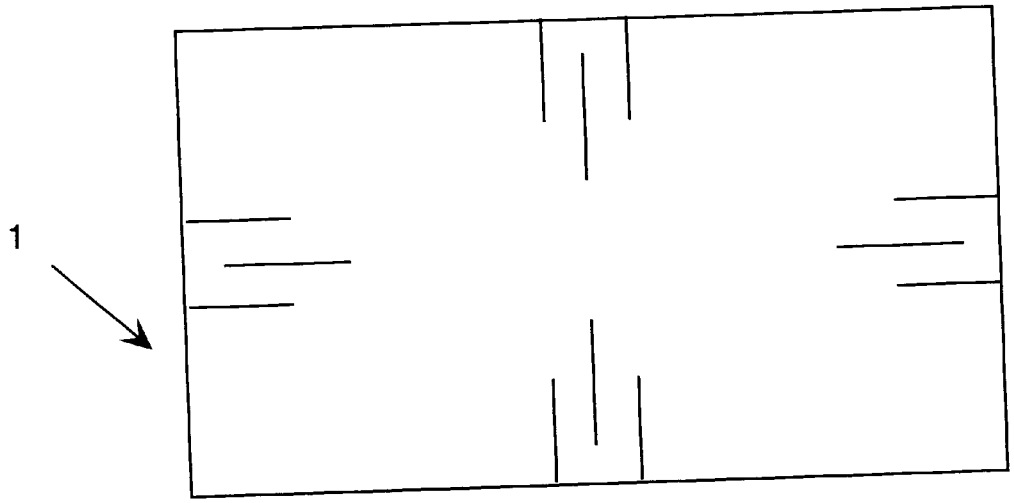
FIG. 2 is a front view of the invention, rotated approximately two degrees.

FIG. 2 shows the device rotated about 2 degrees off center. As the figure indicates, a user looking at the registration marks can clearly see that the device is not on a flat horizontal. FIG. 1 shows the device on the horizontal. This visual alignment of the marks provides the indication of level.

Figure 3:
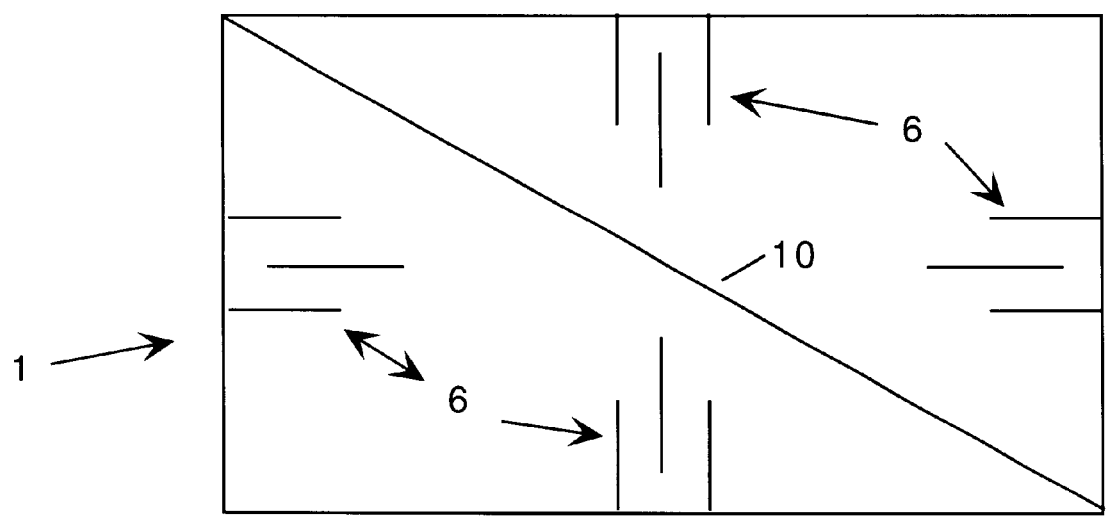
FIG. 3 is a front view of a second embodiment of the invention showing an angle reference mark.
Figure 4:
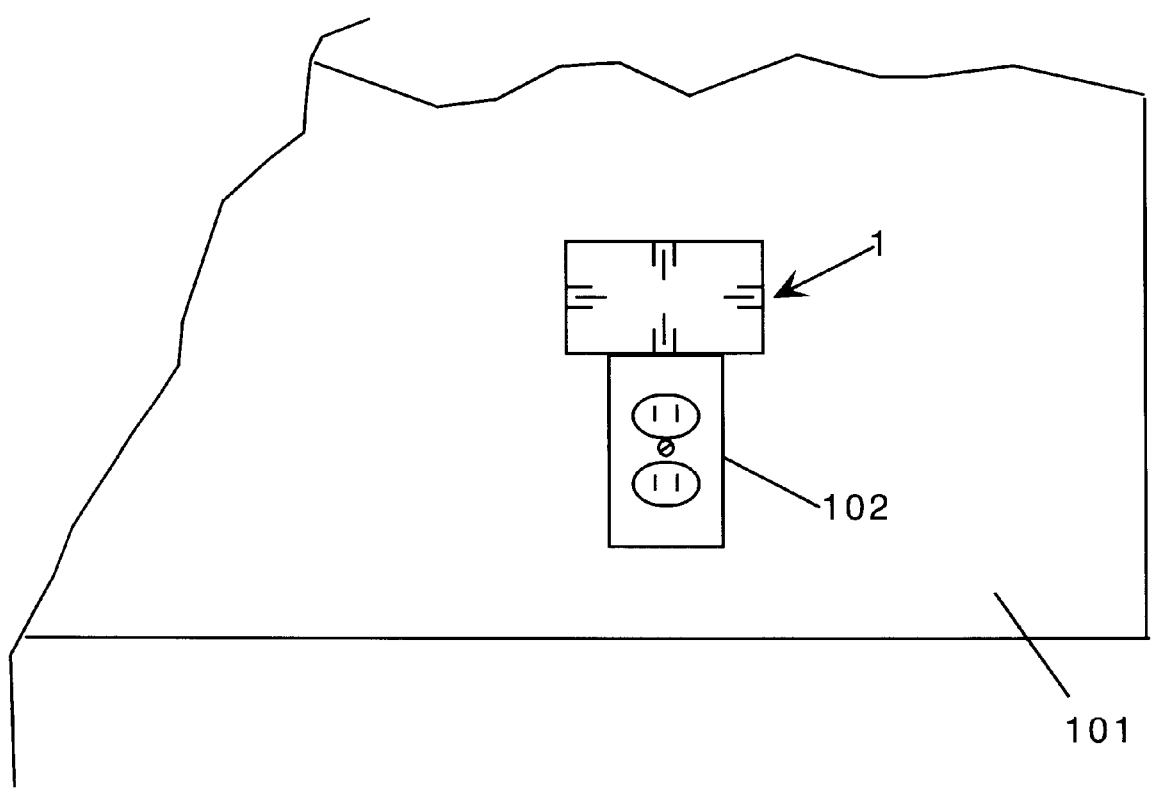
FIG. 4 is a detail view showing the level on top of a typical electrical wall outlet cover.

FIG. 3 shows a second embodiment that shows an angled reference line 10. Lines can be placed to indicate any desired angle. The use of these lines is described below. FIG. 4 shows the device in use. Here, a typical electrical wall outlet 100 is placed in a wall 101. An outlet cover 102 is secured to the outlet in the normal manner. To assure that the cover 102 is level, the device 1 is placed atop the cover as shown. Using the visual technique discussed above, a user can quickly verify if the cover is level and make any needed adjustments. In a similar way, any object can be made level.

In the preferred embodiment, the card 1 is made of thin plastic. The plastic can be rigid, or flexible as desired. Using plastic, the registration marks and other information can be added using common printing techniques. Of course, the card can also be made of paper, thin metal or other materials. As long as the surface and marks are shown as described, these materials will work. Of course, most of the metals and similar materials have to be painted. This not only increases cost, but also decreases the useful life, as the paint becomes worn or faded.

As noted above, the device is suited for leveling small items on walls, pictures and other things. It can be used to level larger items, such as recreational vehicles as well. Heavy equipment operators can mount a larger version on blades to ensure that their equipment blades are level. As can be seen, the uses for this device are numerous.

Figure 6:
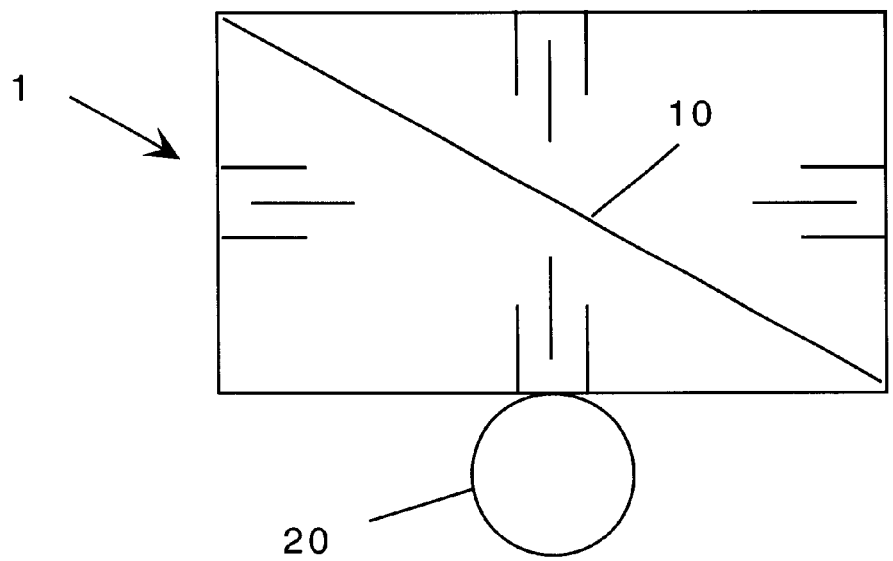
FIG. 6 is a front view of a second embodiment.
Figure 7:
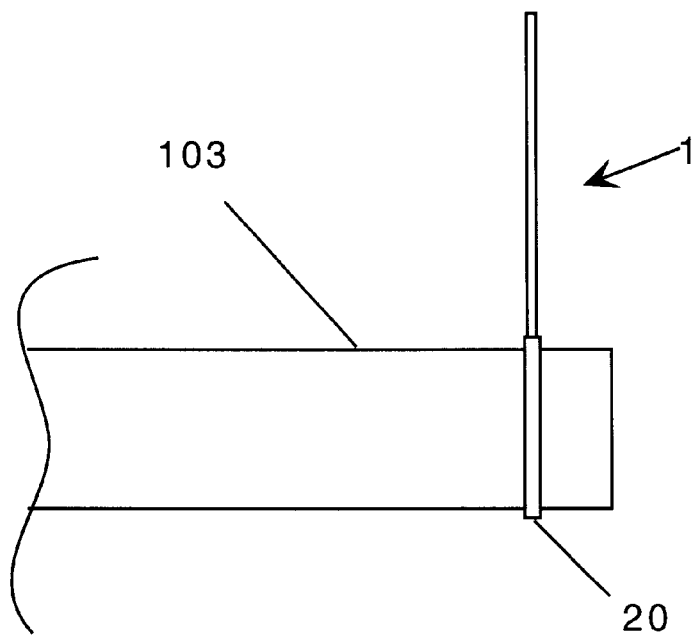
FIG. 7 is a detail view of the second embodiment placed on the end of a length of electrical conduit.
Figure 8:
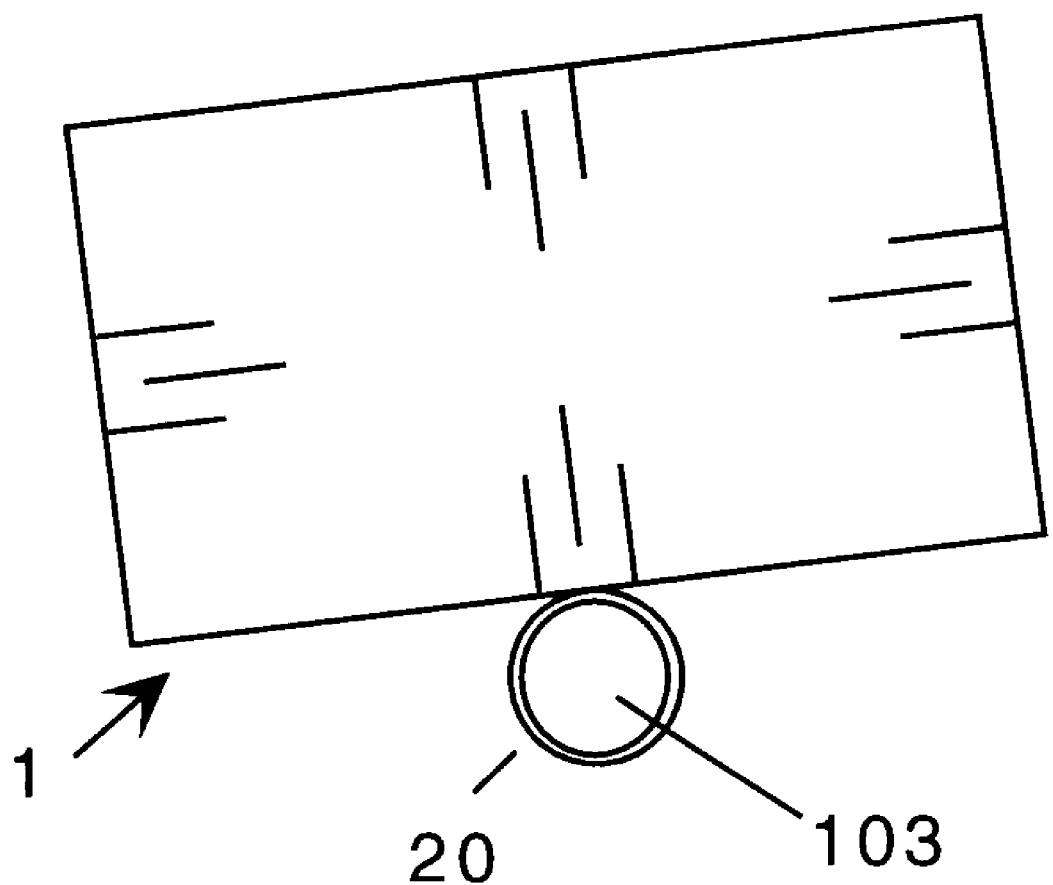
FIG. 8 is a detail view of the second embodiment, placed on the end of a length of electrical conduit that has been rotated a number of degrees.

FIG. 6 shows a second embodiment of the invention. Here, the invention has a mounting ring 20 attached on the bottom as shown. As shown, this embodiment also includes an angular reference line 10 that runs diagonally from one corner to the other. The ring is used to mount the device onto the end of a length of electrical conduit 103. FIG. 7 shows the device 1 mounted on a conduit 103. When bending conduit, it is important that the conduit is not rotated during the bending process. Otherwise, the bend produces unwanted offsets in the conduit that make it unusable in most situations. As shown in FIG. 8, the device can quickly tell an operator if the conduit has rotated. By turning it back to level (FIG. 7), the operator can ensure correct bends every time.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A sight level comprising:
   a) a card, having a front surface, said card having a longitudinal central axis and a latitudinal central axis, wherein said longitudinal central axis and latitudinal central axis are orthogonal, said card having a top, a bottom, a left edge and a right edge;
   b) a first set of registration marks, said first set of registration marks lying on said longitudinal central axis;
   c) a second set of registration marks, said second set of registration marks lying on said latitudinal central axis;
   d) a mounting ring, fixedly attached to the bottom of said card; and
   e) an angular reference line formed on said card.

2. The sight level of claim 1 wherein said first set of registration marks comprises a first pair of sight marking groups, being oppositely disposed on said card.

3. The sight level of claim 2 wherein each of said first pair of sight marking groups comprises a pair of outer lines and a centerline.

4. The sight level of claim 3 wherein the centerline of each of said first pair of sight marking groups is offset inwardly from said pair of outer lines.

5. The sight level of claim 1 wherein said second set of registration marks comprises a second pair of sight marking groups, being oppositely disposed on said card.

6. The sight level of claim 5 wherein each of said second pair of sight marking groups comprises a pair of outer lines and a centerline.

7. The sight level of claim 6 wherein the centerline of each of said second pair of sight marking groups is offset inwardly from said pair of outer lines.

8. The sight level of claim 1 wherein said angular reference line extends from the bottom of said card at said right edge to the top of said card at said left edge.

* * * * *